(12) United States Patent
Sekii

(10) Patent No.: US 10,108,006 B2
(45) Date of Patent: Oct. 23, 2018

(54) ROTARY DRIVE APPARATUS

(71) Applicant: Nidec Corporation, Kyoto (JP)

(72) Inventor: Yoichi Sekii, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 15/663,878

(22) Filed: Jul. 31, 2017

(65) Prior Publication Data

US 2018/0239129 A1    Aug. 23, 2018

(30) Foreign Application Priority Data

Feb. 21, 2017    (JP) .................................. 2017-029704

(51) Int. Cl.
*G02B 26/08* (2006.01)
*G02B 26/10* (2006.01)
*H02K 7/02* (2006.01)

(52) U.S. Cl.
CPC ............. *G02B 26/105* (2013.01); *H02K 7/02* (2013.01)

(58) Field of Classification Search
CPC .... G02B 26/10; G02B 26/105; G02B 26/121; G02B 7/1821; G02F 1/133308
USPC ....................................................... 359/221.3
See application file for complete search history.

(56) References Cited

U.S. PATENT DOCUMENTS

| 5,402,258 A * | 3/1995 | Murakami ........... G02B 7/1821 359/200.1 |
| 2012/0223908 A1* | 9/2012 | Onda ................ G02F 1/133308 345/173 |

FOREIGN PATENT DOCUMENTS

JP    2016-099364 A    5/2016

* cited by examiner

*Primary Examiner* — Euncha Cherry
(74) *Attorney, Agent, or Firm* — Keating & Bennett, LLP

(57) ABSTRACT

This rotary drive apparatus is arranged to cause incoming light coming from a light source to be reflected, and rotate resulting reflected light, and includes a motor including a rotating portion arranged to rotate about a central axis extending in a vertical direction; a flywheel arranged below the light source, supported by the rotating portion, and caused by the rotating portion to rotate about the central axis; and a cover. The flywheel includes a lens arranged to allow the reflected light to pass therethrough; and a main body arranged to directly support the lens, or indirectly support the lens through a lens frame arranged to accommodate the lens therein. At least one of the lens and the lens frame is arranged radially outside of the main body. An upper surface of the main body is arranged to cross a light path along which the incoming light travels at a position axially overlapping with at least a portion of the light source. At least a portion of the lens is arranged to cross a light path along which the reflected light travels. At least a portion of the cover is arranged to extend all the way around the flywheel radially outside of the flywheel. At least one of at least a portion of the lens and at least a portion of the lens frame is arranged radially inside of the cover.

11 Claims, 11 Drawing Sheets

ROTARY DRIVE APPARATUS

CROSS REFERENCE TO RELATED APPLICATIONS

This application claims the benefit of priority to Japanese Patent Application No. 2017-029704 filed on Feb. 21, 2017. The entire contents of this application are hereby incorporated herein by reference.

BACKGROUND OF THE INVENTION

1. Field of the Invention

The present invention relates to a rotary drive apparatus.

2. Description of the Related Art

A known scanner apparatus used for position recognition in a head-mounted display (HMD) or the like typically has installed therein a mirror arranged to reflect incoming light coming from a light source, and a lens arranged to allow reflected light to pass therethrough. An optical apparatus including a light-transmitting member, including such a known lens, is described in, for example, JP-A 2016-099364.

In a configuration described in JP-A 2016-099364, the light-transmitting member is installed and fixed in a groove portion of an optical housing, the groove portion being provided with a double-sided tape or an adhesive. Thus, if this configuration is used in a rotary drive apparatus, such as a scanner apparatus, an application of a centrifugal force during rotation may cause a detachment of the light-transmitting member, which may lead to a flying away of the light-transmitting member.

SUMMARY OF THE INVENTION

A rotary drive apparatus according to a preferred embodiment of the present invention is arranged to cause incoming light coming from a light source to be reflected, and rotate resulting reflected light, and includes a motor including a rotating portion arranged to rotate about a central axis extending in a vertical direction; a flywheel arranged below the light source, supported by the rotating portion, and caused by the rotating portion to rotate about the central axis; and a cover arranged to cover at least a portion of the flywheel. The flywheel includes a lens arranged to allow the reflected light to pass therethrough; and a main body arranged to directly support the lens, or indirectly support the lens through a lens frame arranged to accommodate the lens therein. At least one of the lens and the lens frame is arranged radially outside of the main body. An upper surface of the main body is arranged to cross a light path along which the incoming light travels at a position axially overlapping with at least a portion of the light source. At least a portion of the lens is arranged to cross a light path along which the reflected light travels. At least a portion of the cover is arranged to extend all the way around the flywheel radially outside of the flywheel. At least one of at least a portion of the lens and at least a portion of the lens frame is arranged radially inside of the cover.

The rotary drive apparatus according to the above preferred embodiment of the present invention includes the cover, at least a portion of which is arranged to extend all the way around the flywheel radially outside of the flywheel. In addition, at least one of at least a portion of the lens and at least a portion of the lens frame is arranged radially inside of the cover. This contributes to preventing a detachment and a flying away of the lens, i.e., a light-transmitting member, during rotation of the rotary drive apparatus.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel to a central axis of a motor, which will be described below, is referred to by the term "axial direction", "axial", or "axially", that directions perpendicular to the central axis of the motor are each referred to by the term "radial direction", "radial", or "radially", and that a direction along a circular arc centered on the central axis of the motor is referred to by the term "circumferential direction", "circumferential", or "circumferentially". It is also assumed herein that an axial direction is a vertical direction, and that a side on which a light source is arranged with respect to the motor is defined as an upper side. The shape of each member or portion and relative positions of different members or portions will be described based on the above assumptions. It should be noted, however, that the above definitions of the vertical direction and the upper side are not meant to restrict in any way the orientation of a rotary drive apparatus according to any preferred embodiment of the present invention when in use. Also note that the term "parallel" as used herein includes both "parallel" and "substantially parallel". Also note that the term "perpendicular" as used herein includes both "perpendicular" and "substantially perpendicular".

1. First Preferred Embodiment

1-1. Structure of Rotary Drive Apparatus

Figure 1:
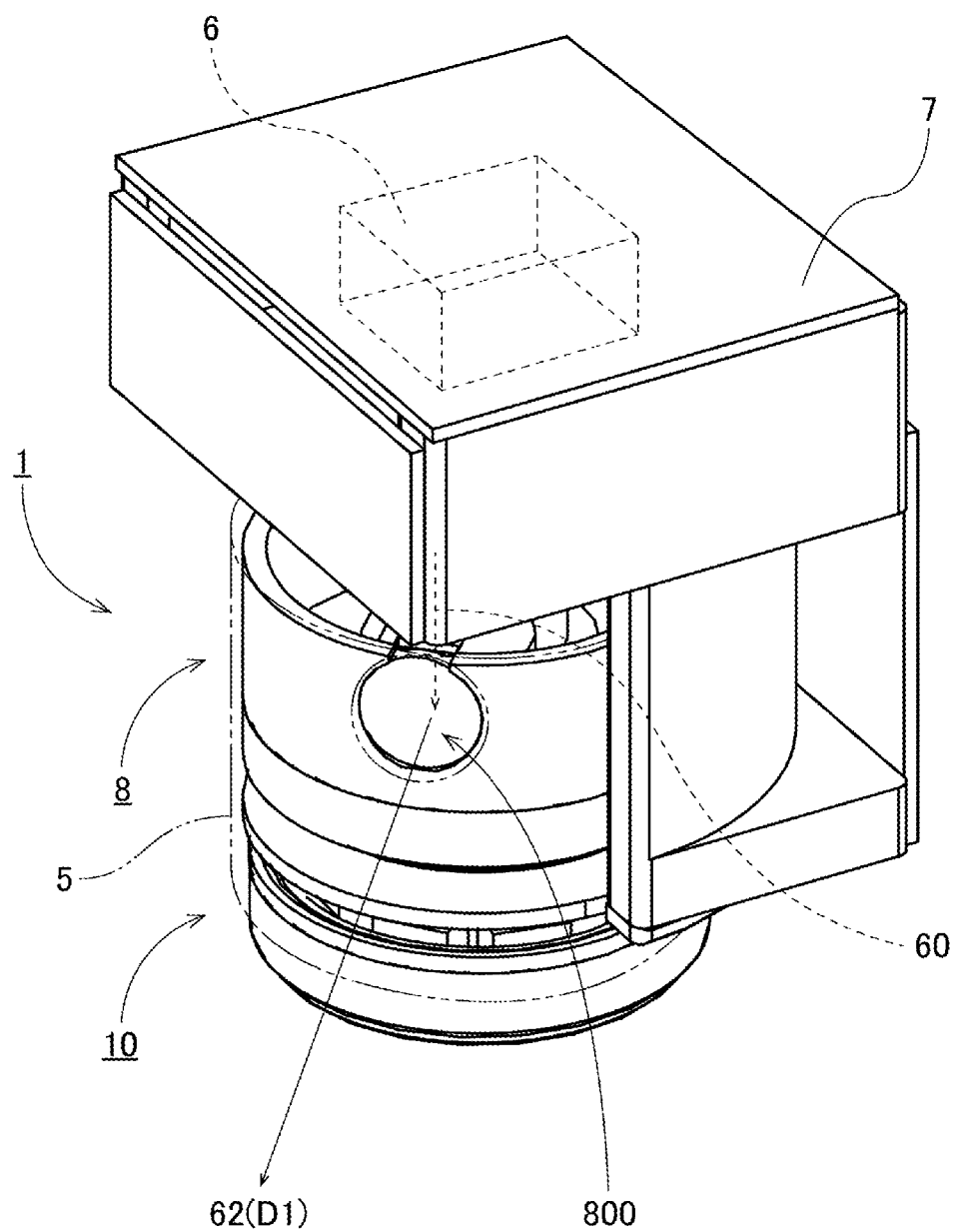
FIG. 1 is a perspective view of a light source, a frame, and a rotary drive apparatus according to a first preferred embodiment of the present invention.

FIG. 1 is a perspective view of a light source 6, a frame 7, and a rotary drive apparatus 1 according to a first preferred embodiment of the present invention. In FIG. 1, a cover 5 is represented by a chain double-dashed line to illustrate a flywheel 8. The rotary drive apparatus 1 is an apparatus arranged to cause incoming light 60 coming from the light source 6 to be reflected in a radial direction (i.e., a first radial direction D1), and emit resulting reflected light 62 to an outside of the rotary drive apparatus 1 while rotating the reflected light 62. The frame 7, in which the light source 6 is installed, is arranged above the rotary drive apparatus 1. The frame 7 is fixed to a case or the like in which the rotary drive apparatus 1 is arranged. The incoming light 60, which travels downward along a central axis 9, which will be described below, of a motor 10, is emitted from the light source 6. In the present preferred embodiment, the light source 6 and the frame 7 are arranged outside of the rotary drive apparatus 1. Note, however, that each of the light source 6 and the frame 7 may alternatively be included in the rotary drive apparatus 1.

Referring to FIG. 1, the rotary drive apparatus 1 includes the motor 10, the flywheel 8, and the cover 5, which is arranged to cover at least a portion of the flywheel 8 and which will be described below.

1-2. Structure of Motor

Figure 2:
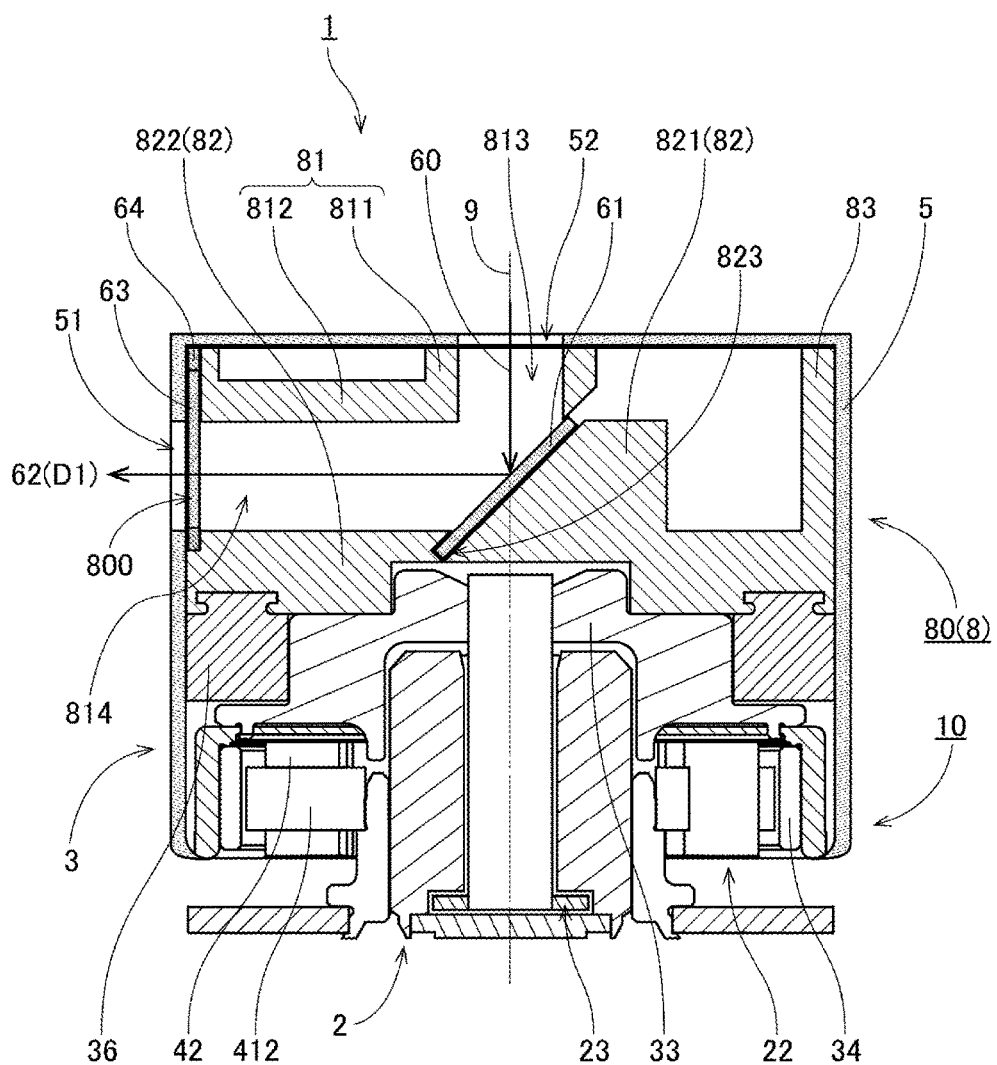
FIG. 2 is a vertical sectional view of the rotary drive apparatus according to the first preferred embodiment.

Next, the structure of the motor 10 will now be described below. FIG. 2 is a vertical sectional view of the rotary drive apparatus 1 according to the first preferred embodiment.

Referring to FIG. 2, the motor 10 includes a stationary portion 2 including a stator 22, and a rotating portion 3 including a rotor hub portion 33, a magnet 34, and an inertia portion 36. The rotor hub portion 33 has at least a portion thereof arranged above the stator 22, and is arranged to extend in an annular shape around the central axis 9, which extends in the vertical direction. The inertia portion 36 is an annular member made of a metal, and having a specific gravity greater than that of a main body 80 of the flywheel 8, which will be described below. In addition, the inertia portion 36 is fixed to the rotor hub portion 33. The stationary portion 2 is arranged to be stationary relative to the case or the like in which the rotary drive apparatus 1 is arranged. The rotating portion 3 is supported through a bearing portion 23 to be rotatable about the central axis 9, which extends in the vertical direction, with respect to the stationary portion 2.

Once electric drive currents are supplied to coils 42 included in the stationary portion 2, magnetic flux is generated around each of a plurality of teeth 412, which are magnetic cores for the coils 42. Then, interaction between the magnetic flux of the teeth 412 and magnetic flux of the magnet 34 included in the rotating portion 3 produces a circumferential torque between the stationary portion 2 and the rotating portion 3, so that the rotating portion 3 is caused to rotate about the central axis 9 with respect to the stationary portion 2. Thus, the flywheel 8, which is supported by the rotating portion 3 and is capable of rotating together with the rotating portion 3, is caused by the rotating portion 3 to rotate about the central axis 9.

As the bearing portion 23, a fluid dynamic bearing, in which a portion of the stationary portion 2 and a portion of the rotating portion 3 are arranged opposite to each other with a gap in which a lubricating oil exists therebetween and which is arranged to induce a fluid dynamic pressure in the lubricating oil, is used, for example. Note that a bearing of another type, such as, for example, a rolling-element bearing, may alternatively be used as the bearing portion 23.

1-3. Structure of Flywheel

Next, the structure of the flywheel 8 will now be described below. Hereinafter, reference will be made to FIGS. 1 and 2 appropriately as well as FIGS. 3 and 4, which will be described below.

The flywheel 8 is arranged below the light source 6, and is supported by an upper end portion of the rotating portion 3 of the motor 10. The flywheel 8 is arranged to rotate about the central axis 9 together with the rotating portion 3. The flywheel 8 is fixed to an upper surface of the rotating portion 3 through, for example, engagement, an adhesive, or the like. Referring to FIG. 2, the flywheel 8 includes a mirror 61, a lens 63, a lens frame 64, and the main body 80. The main body 80 is arranged to directly support the lens 63, or indirectly support the lens 63 through the lens frame 64, which is arranged to accommodate the lens 63 therein. In addition, the main body 80 includes an upper support portion 81, a lower support portion 82, and an outer cylindrical portion 83. A resin, for example, is used as a material of the main body 80. A metal or a resin, for example, is used as a material of each of the mirror 61, the lens 63, and the lens frame 64.

Figure 3:
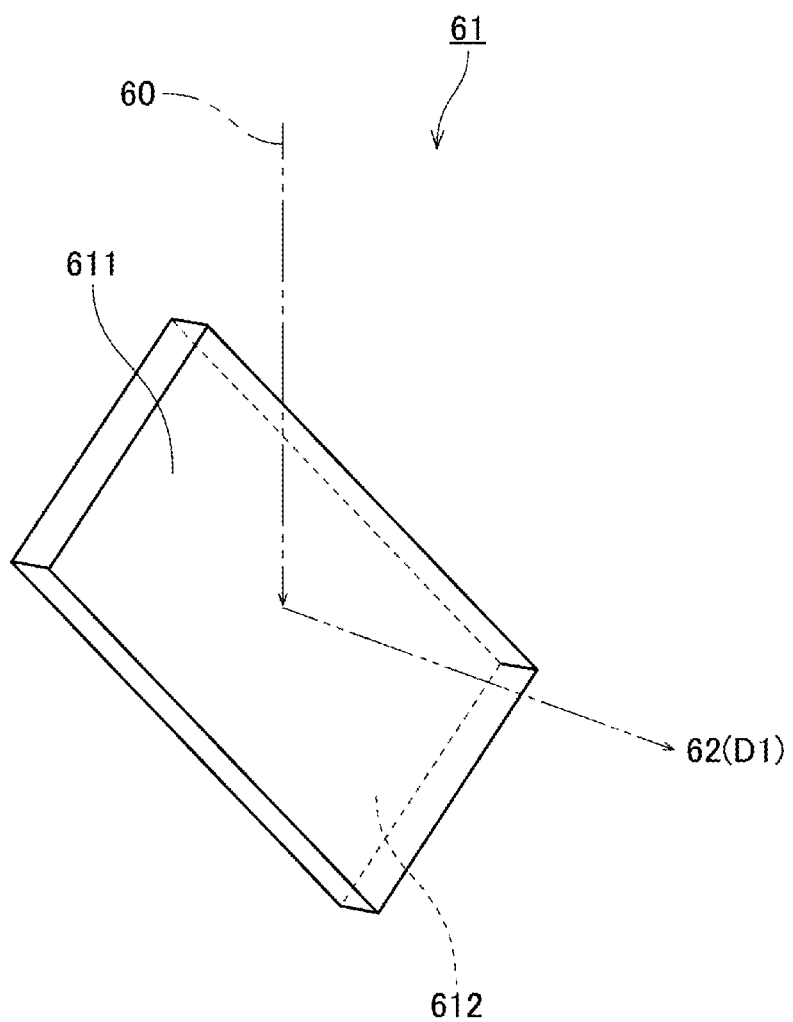
FIG. 3 is a perspective view of a mirror according to the first preferred embodiment.

FIG. 3 is a perspective view of the mirror 61 according to the first preferred embodiment. Referring to FIG. 3, the mirror 61 is in the shape of a flat rectangular parallelepiped. In other words, the mirror 61 is in the shape of a rectangular plate. In a situation in which the mirror 61 is fixed to the main body 80 of the flywheel 8, the mirror 61 has at least a portion thereof arranged on the central axis 9, and is inclined at an angle of 45° with respect to the axial direction and the first radial direction D1. In addition, the mirror 61 is held and fixed in a gap axially between the upper support portion 81 and the lower support portion 82. The incoming light 60 impinges on a central portion of an upper surface 611, which is a reflecting surface, of the mirror 61. The central portion of the upper surface 611 refers to the entire upper surface 611, excluding a peripheral portion of the upper surface 611. A fully reflective mirror, for example, is used as the mirror 61.

The upper support portion 81 is a tubular portion including an upper vertical cylindrical portion 811 and an upper horizontal cylindrical portion 812. In the present preferred embodiment, the upper vertical cylindrical portion 811, the upper horizontal cylindrical portion 812, the lower support portion 82, and the outer cylindrical portion 83 are defined as a single monolithic member by a resin injection molding process. Note, however, that the upper vertical cylindrical portion 811, the upper horizontal cylindrical portion 812, the lower support portion 82, and the outer cylindrical portion 83 may alternatively be defined by separate members.

The upper vertical cylindrical portion 811 is a cylindrical portion arranged to extend in the axial direction from a radially inner end portion of the upper horizontal cylindrical portion 812. An inner circumferential surface of the upper vertical cylindrical portion 811 is arranged to extend in parallel with the central axis 9 of the motor 10. A cavity 813 radially inside of the upper vertical cylindrical portion 811 is arranged to define a light path. That is, an upper surface of the main body 80 of the flywheel 8, which includes the upper vertical cylindrical portion 811, is arranged to cross a light path along which the incoming light 60 travels at a position axially overlapping with at least a portion of the light source 6. A portion of a lower end portion of the upper vertical cylindrical portion 811 is arranged to be in contact with a portion of the peripheral portion of the upper surface 611 of the mirror 61 at a circumferential position in the situation in which the mirror 61 is fixed to the flywheel 8. This contributes to more securely fixing the mirror 61.

The upper horizontal cylindrical portion 812 is a cylindrical portion arranged to extend outward in a radial direction (i.e., in the first radial direction D1) from an outer circumferential portion of the upper vertical cylindrical portion 811. In addition, at least one of the lens 63 and the lens frame 64 is arranged radially outside of a joining portion 822, which will be described below, and the upper horizontal cylindrical portion 812, which are included in the main body 80. A cavity 814 inside of the upper horizontal cylindrical portion 812 is joined to the cavity 813 radially inside of the upper vertical cylindrical portion 811 at right angles. Further, the cavity 814 inside of the upper horizontal cylindrical portion 812, the mirror 61, and the lens 63 are arranged to overlap at least in part with one another when viewed in the first radial direction D1. The cavity 814 inside of the upper horizontal cylindrical portion 812 is arranged to define a light path. At least a portion of the lens 63 is arranged to cross a light path along which the reflected light 62 travels The outer cylindrical portion 83 is a cylindrical portion arranged to extend along the central axis 9 radially outside of the upper support portion 81. An outer circumferential surface of the outer cylindrical portion 83 defines a portion of an outer circumferential surface of the flywheel 8. In addition, a through hole 800, which is arranged to pass through the outer cylindrical portion 83 in the first radial direction D1, is defined in the outer cylindrical portion 83 at a circumferential position radially outside of the cavity 814. In addition, radially outer end portions of the upper horizontal cylindrical portion 812 and the joining portion 822, which will be described below, are joined to an inner circumferential surface of a portion of the outer cylindrical portion 83 which lies in the vicinity of the through hole 800. Thus, the outer cylindrical portion 83, the upper support portion 81, and the lower support portion 82, which will be described below, are joined to one another.

The lower support portion 82 includes a lower vertical cylindrical portion 821 and the joining portion 822. The lower vertical cylindrical portion 821 is a columnar portion arranged to extend in the axial direction, and having at least a portion thereof arranged below the upper support portion 81. The mirror 61 is held and fixed in a gap axially between the lower end portion of the upper vertical cylindrical portion 811 and an upper end portion of the lower vertical cylindrical portion 821. This contributes to more securely fixing the mirror 61. Note that the lower vertical cylindrical portion 821 may alternatively be arranged to have a tubular structure and have a cavity (not shown) defined radially inside thereof. Further, a portion of the incoming light 60 may be allowed to pass through the mirror 61, and the lower vertical cylindrical portion 821 may be arranged to define a light path along which the portion of the incoming light 60 which has passed through the mirror 61 travels in the cavity (not shown) radially inside thereof.

The joining portion 822 is arranged to extend radially inward from an inner circumferential surface of the outer cylindrical portion 83, and is joined to an outer circumferential surface of the lower vertical cylindrical portion 821. Thus, the outer cylindrical portion 83 and the lower support portion 82 are joined to each other. In the situation in which the mirror 61 is fixed to the flywheel 8, a lower end portion of the mirror 61 is fitted in an inner recessed portion 823, which is recessed downward from an upper surface of the lower support portion 82, in the vicinity of a junction of the lower vertical cylindrical portion 821 with the joining portion 822. This contributes to more effectively preventing a displacement of the mirror 61.

Further, a portion of the joining portion 822 is recessed radially inward from an outer circumferential surface thereof at one circumferential position. This recessed portion is arranged to axially and radially overlap with a radially outer portion of the upper horizontal cylindrical portion 812 of the upper support portion 81 in the situation in which the mirror 61 is fixed to the flywheel 8. In the present preferred embodiment, the outer cylindrical portion 83 and the radially outer portion of the upper horizontal cylindrical portion 812 are joined to each other in the vicinity of the above recessed portion when the upper support portion 81, the lower support portion 82, and the outer cylindrical portion 83 are defined by the resin injection molding process.

Figure 4:
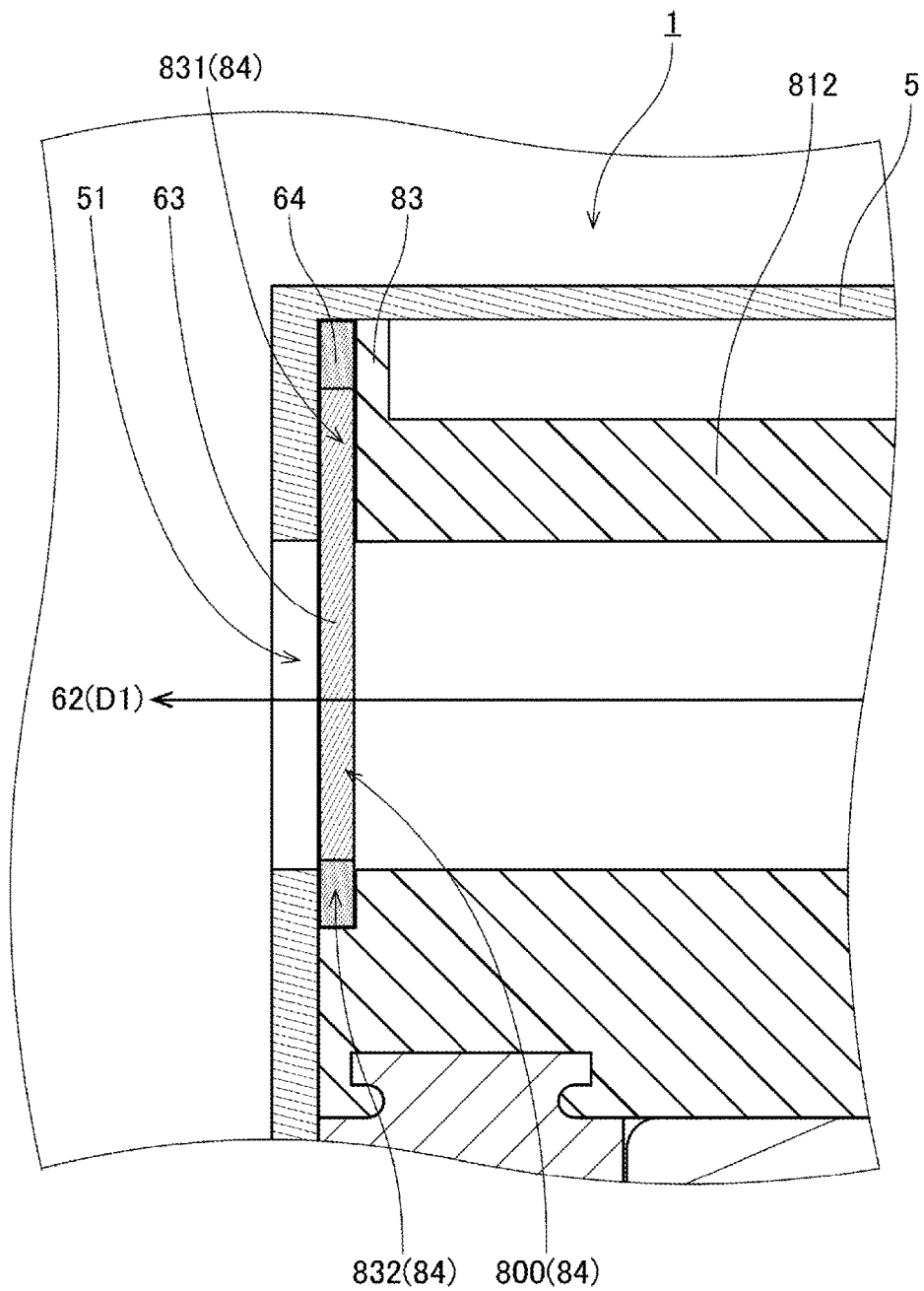
FIG. 4 is a partial vertical sectional view of the rotary drive apparatus according to the first preferred embodiment.

FIG. 4 is a partial vertical sectional view of the rotary drive apparatus 1 according to the first preferred embodiment. Referring to FIG. 4, a cut portion 831 is defined in a radially outer portion of a portion of the outer cylindrical portion 83 above the through hole 800 at one circumferential position. In addition, an accommodating portion 84, which is a space in the shape of a plate, is defined by the cut portion 831, the through hole 800, and an outer recessed portion 832, which is recessed downward from a surface of the outer cylindrical portion 83 which faces a lower end of the through hole 800. The accommodating portion 84 is arranged to have a sufficient size to accommodate the lens 63 therein.

Similarly to the mirror 61, the lens 63 is in the shape of a plate. The lens 63 is accommodated in the accommodating portion 84 through the lens frame 64, which is arranged to accommodate the lens 63 therein, and is fixed through adhesion or the like. In addition, the lens 63 and the lens frame 64 are arranged at right angles to the first radial direction D1, that is, in parallel with the central axis 9, to cover the through hole 800 in a situation in which the lens 63 and the lens frame 64 are fixed in the accommodating portion 84. The reflected light 62, which is obtained by the mirror 61 reflecting the incoming light 60 in the flywheel 8, passes through a central portion of the lens 63 to be emitted to an outside of the flywheel 8. The central portion of the lens 63 refers to the entire lens 63, excluding a peripheral portion of the lens 63.

The incoming light 60, which is emitted from the light source 6, enters the above-described flywheel 8 from above an upper surface of the flywheel 8, and travels downward along the central axis 9 in the cavity 813 radially inside of the upper vertical cylindrical portion 811. The incoming light 60 is then reflected by the mirror 61, and, further, travels outward in the first radial direction D1 in the cavity 814 inside of the upper horizontal cylindrical portion 812, and is emitted out of the rotary drive apparatus 1 through the lens 63.

The mirror 61 of the flywheel 8 is arranged to reflect the incoming light 60 from the light source 6 and emit the reflected light 62 to the outside while rotating about the central axis 9 together with the rotating portion 3 of the motor 10. Therefore, the first radial direction D1, which is a direction in which the reflected light 62 is emitted, also rotates together with the rotating portion 3. Thus, a wide range can be irradiated with light. Note that the rotation speed of the rotary drive apparatus 1 can be recognized by sensing rotation of the reflected light 62, which is emitted out of the flywheel 8, outside of the rotary drive apparatus 1.

Note that the rotary drive apparatus 1 may further include, in addition to the flywheel 8 arranged to emit the reflected light 62 to the outside in the first radial direction D1, another flywheel (not shown) which is arranged to emit reflected light to the outside in a second radial direction different from the first radial direction D1, and which is arranged, for example, below the motor 10. In this case, a half mirror the transmissivity and reflectivity of which are substantially equal is used as the mirror 61. Then, a half of the incoming light 60 which impinges on the mirror 61 in the flywheel 8 is reflected in the first radial direction D1 to be emitted to the outside. In addition, a remaining half of the incoming light 60 which impinges on the mirror 61 passes through the mirror 61, and travels downward in the cavity (not shown) radially inside of the lower vertical cylindrical portion 821. Further, a through hole (not shown) passing through the motor 10 in the axial direction is defined around the central axis 9 in the motor 10. Thus, the portion of the incoming light 60 which has passed through the mirror 61 passes through the through hole and reaches the other flywheel arranged below the motor 10. In this other flywheel, this portion of the incoming light 60 is reflected in the second radial direction to be emitted to the outside. Note that the rotary drive apparatus 1 may include, above the flywheel 8, another flywheel which is arranged to emit reflected light to the outside in a second radial direction different from the first radial direction D1. Also note that two mirrors (not shown) which are arranged to reflect the incoming light 60 in mutually different directions may alternatively be installed in the single flywheel 8.

When light is emitted out in the two different directions, i.e., the first radial direction D1 and the second radial direction, as described above, light beams that are emitted out in the two different directions take different times to reach an object to be irradiated with light while the motor 10 is rotating, and this makes it possible to precisely recognize the three-dimensional position of the object in a space. Note that the other flywheel may alternatively be arranged in a rotary drive apparatus (not shown) other than the rotary drive apparatus 1 including the flywheel 8.

1-4. Structure of Cover

Next, the structure of the cover 5 will now be described below. The following description will be made with reference to FIGS. 1 to 4 appropriately.

When the rotary drive apparatus 1 is manufactured, the flywheel 8, which is arranged to support, for example, the mirror 61 and the lens 63, is attached to an upper portion of the motor 10, and thereafter, the cover 5 is attached to the rotary drive apparatus 1. After the cover 5 is attached to the rotary drive apparatus 1, at least a portion of the cover 5 extends all the way around the flywheel 8 radially outside of the flywheel 8. In addition, at least one of at least a portion of the lens 63 or at least a portion of the lens frame 64, which is arranged to accommodate the lens 63 therein, is arranged radially inside of the cover 5. Covering the rotary drive apparatus 1 with the cover 5 on a radially outer side of the lens 63 or the lens frame 64 contributes to more securely fixing the lens 63 or the lens frame 64 when compared to the case where the lens 63 or the lens frame is fixed through a tape or an adhesive. In addition, the likelihood that an application of a centrifugal force to each of the lens 63 and the lens frame 64 will cause a detachment thereof when the flywheel 8 and the rotating portion 3 of the motor 10 rotate when the rotary drive apparatus 1 is driven is reduced. Further, if the lens 63 or the lens frame 64 should be detached from the main body 80 of the flywheel 8, provision of the cover 5 would prevent the lens 63 or the lens frame 64 from flying away from the rotary drive apparatus 1.

A heat-shrinkable tube made of a resinoid material which shrinks when heated, for example, is used as the cover 5. In manufacture of the rotary drive apparatus 1, after the flywheel 8 is attached to the upper portion of the motor 10, the flywheel 8 is inserted into a bladder-shaped heat-shrinkable tube, for example, and the heat-shrinkable tube is heated. Thus, the cover 5, which is the heat-shrinkable tube, shrinks to be fitted to the outer circumferential surface of the flywheel 8. As a result, the lens 63 or the lens frame 64 is securely fixed to the main body 80 of the flywheel 8. Note that the cover 5, which is the heat-shrinkable tube, is, for example, arranged to have a black outer circumferential surface, and is made of a resin having a reflectivity lower than that of an outer circumferential surface of the main body 80 of the flywheel 8. This contributes to preventing diffuse reflection of the incoming light 60 and the reflected light 62 mentioned above.

An upper end portion of the cover 5 is arranged to cover up to at least a portion of the upper surface of the main body 80 of the flywheel 8 after the thermal shrinkage. Meanwhile, a lower end portion of the cover 5 is arranged to cover up to at least a portion of a lower surface of the rotating portion 3 of the motor 10 after the thermal shrinkage. Thus, the lens 63 or the lens frame 64 is more securely fixed to the main body 80 of the flywheel 8. This results in a reduction in the likelihood that an application of a centrifugal force to each of the lens 63 and the lens frame 64 will cause a detachment thereof when the flywheel 8 and the rotating portion 3 of the motor 10 rotate when the rotary drive apparatus 1 is driven. Further, if the lens 63 or the lens frame 64 should be detached from the main body 80 of the flywheel 8, the provision of the cover 5 would prevent the lens 63 or the lens frame 64 from flying away from the rotary drive apparatus 1. Note that an outer circumferential surface of the rotating portion 3 of the motor 10 is a metal surface, and this metal surface has a reflectivity higher than that of the outer circumferential surface of the cover 5. The outer circumferential surface of the rotating portion 3 of the motor 10 is covered with the cover 5 over the entire circumferential extent thereof as described above, and this contributes to more effectively preventing diffuse reflection of the incoming light 60 and the reflected light 62.

The cover 5 according to the present preferred embodiment includes a first opening 51. The first opening 51 is arranged to pass through a portion of the cover 5 in a radial direction at a position radially outside of the aforementioned cavity 814 and radially overlapping with at least a portion of the lens 63. This allows the reflected light 62, passing through the central portion of the lens 63, to be emitted to an outside of the main body 80 of the flywheel 8 through the first opening 51.

In addition, the cover 5 according to the present preferred embodiment includes a second opening 52. The second opening 52 is arranged to pass through a portion of the cover 5 in the axial direction at a position axially above the aforementioned cavity 813 and axially overlapping with at least a portion of the light source 6. This allows the incoming light 60 coming from the light source 6 to enter into an interior of the main body 80 of the flywheel 8 through the second opening 52.

2. Example Modifications

While preferred embodiments of the present invention have been described above, it will be understood that the present invention is not limited to the above-described preferred embodiments.

Figure 5:
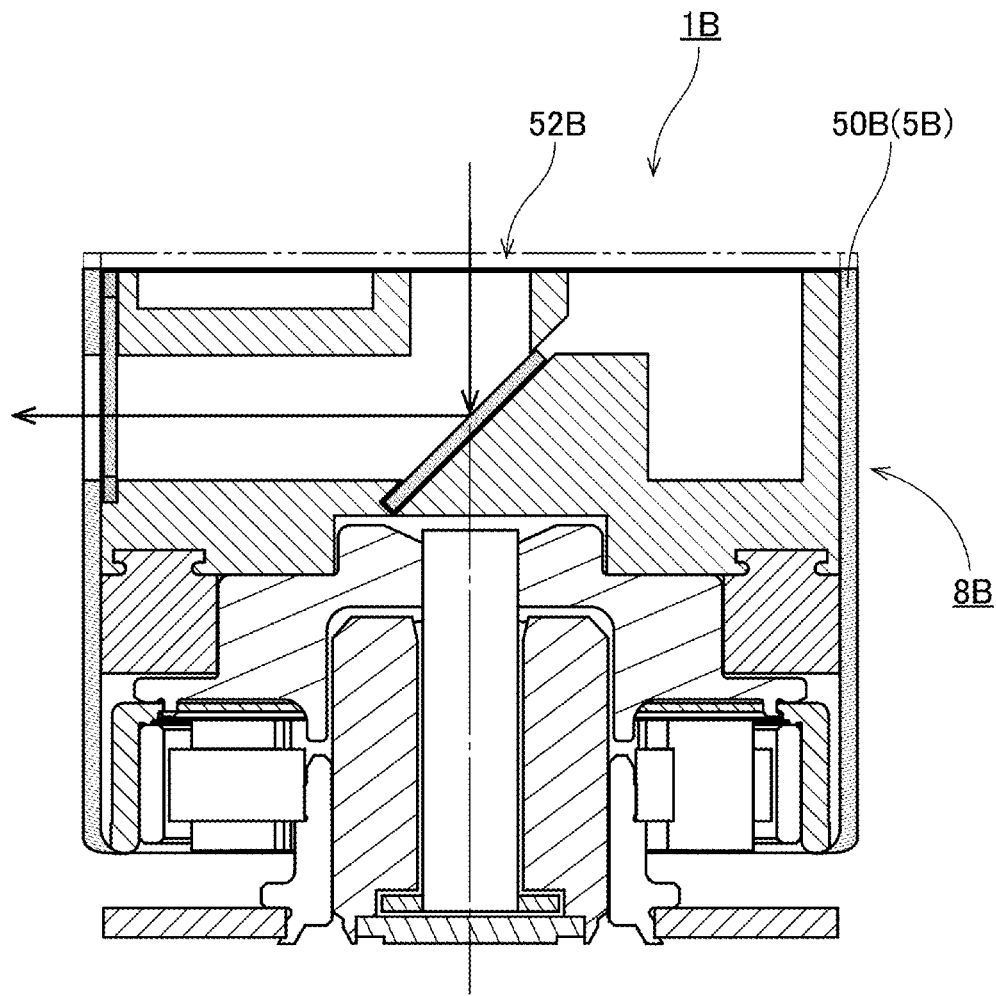
FIG. 5 is a vertical sectional view of a rotary drive apparatus according to a modification of the first preferred embodiment.

FIG. 5 is a vertical sectional view of a rotary drive apparatus 1B according to a modification of the first preferred embodiment. In the modification illustrated in FIG. 5, a second opening 52B is arranged to extend over a whole area over a flywheel 8B. That is, a cover 5B includes only a cover tubular portion 50B, which is tubular and is arranged to extend in the axial direction radially outside of the flywheel 8B. An outer circumferential edge of the second opening 52B is arranged at an upper end portion of the cover tubular portion 50B. Thus, the structure of the cover 5B can be simplified. In addition, a reduction in a production cost of the cover 5B can be achieved.

Figure 6:
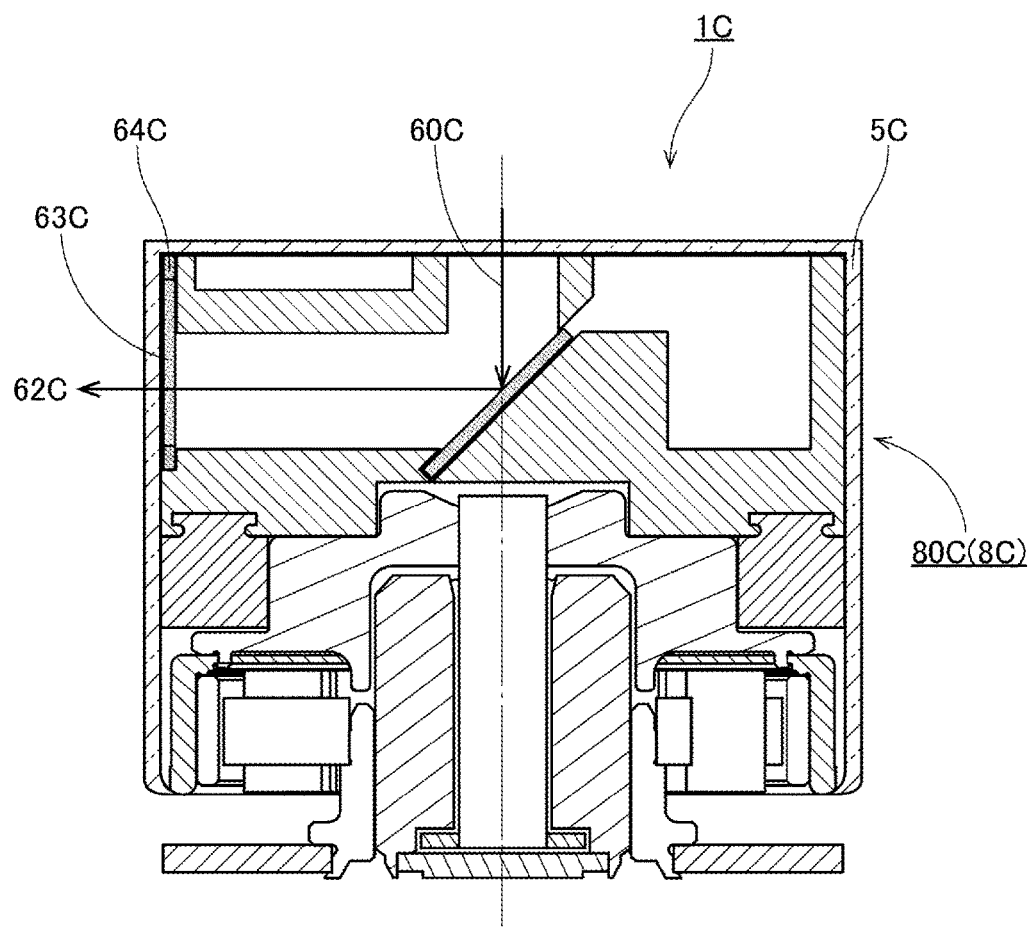
FIG. 6 is a vertical sectional view of a rotary drive apparatus according to a modification of the first preferred embodiment.

FIG. 6 is a vertical sectional view of a rotary drive apparatus 1C according to another modification of the first preferred embodiment. In the modification illustrated in FIG. 6, a cover 5C is arranged to have a light-transmitting property. This allows reflected light 62C to be emitted to an outside of a main body 80C of a flywheel 8C through a lens 63C and the cover 5C without the need to define a first opening as mentioned above in the cover 5C. In addition, incoming light 60C is allowed to enter into an interior of the main body 80C of the flywheel 8C through the cover 5C without the need to define a second opening as mentioned above in the cover 5C. Further, an outer circumferential surface of the flywheel 8C can be entirely covered with the cover 5C since neither the first opening nor the second opening need to be defined in the cover 5C. Thus, the lens 63C and a lens frame 64C are more securely fixed to the main body 80C of the flywheel 8C. Note that, even in the case where the cover 5C having the light-transmitting property is used, the first opening and the second opening may be defined in the cover 5C.

Figure 7:
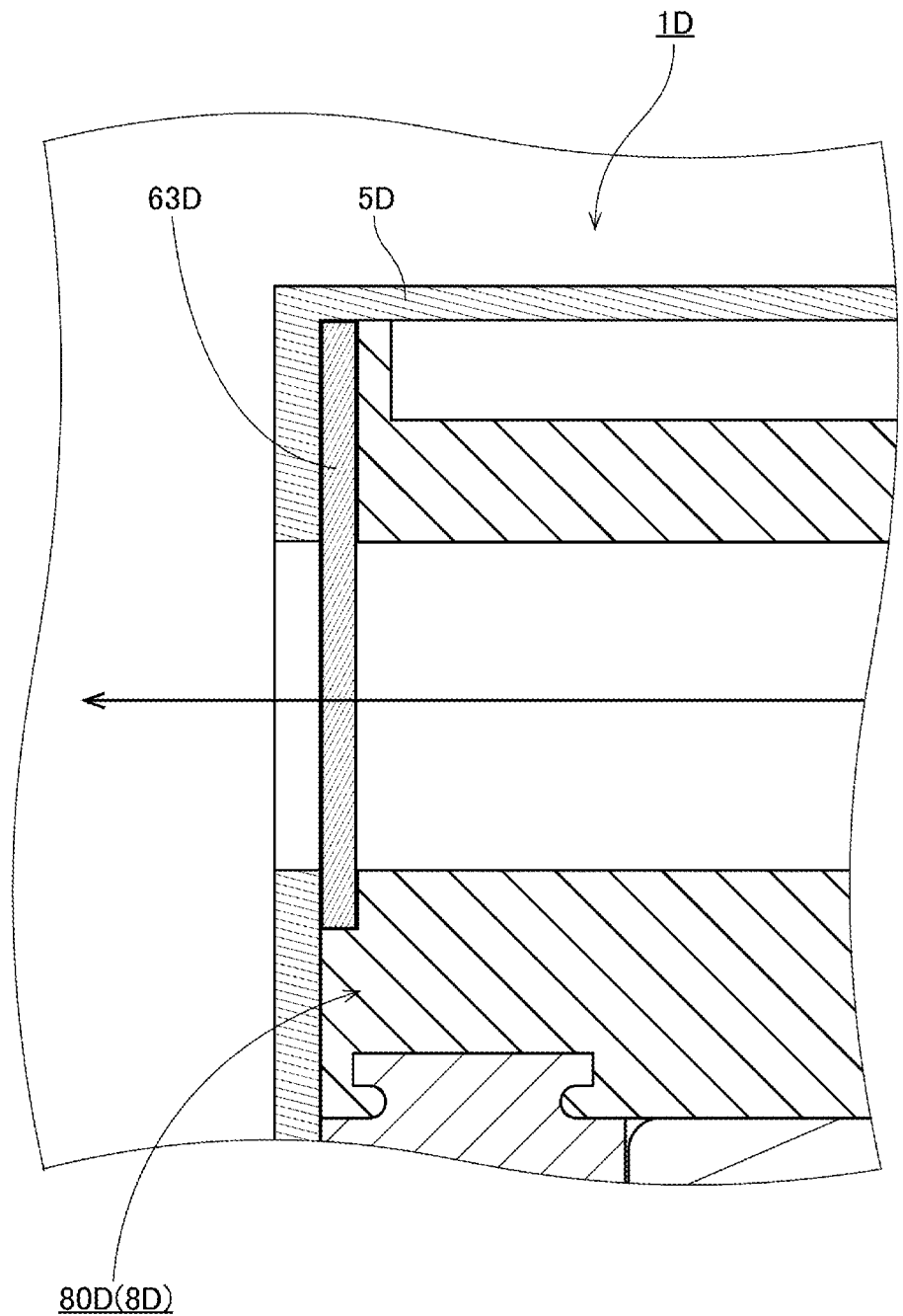
FIG. 7 is a partial vertical sectional view of a rotary drive apparatus according to a modification of the first preferred embodiment.

FIG. 7 is a partial vertical sectional view of a rotary drive apparatus 1D according to yet another modification of the first preferred embodiment. As in the modification illustrated in FIG. 7, a lens 63D may be directly supported by a main body 80D of a flywheel 8D without intervention of a lens frame. In addition, a radially outer surface and an upper surface of the lens 63D may be directly covered with the cover 5D.

Figure 8:
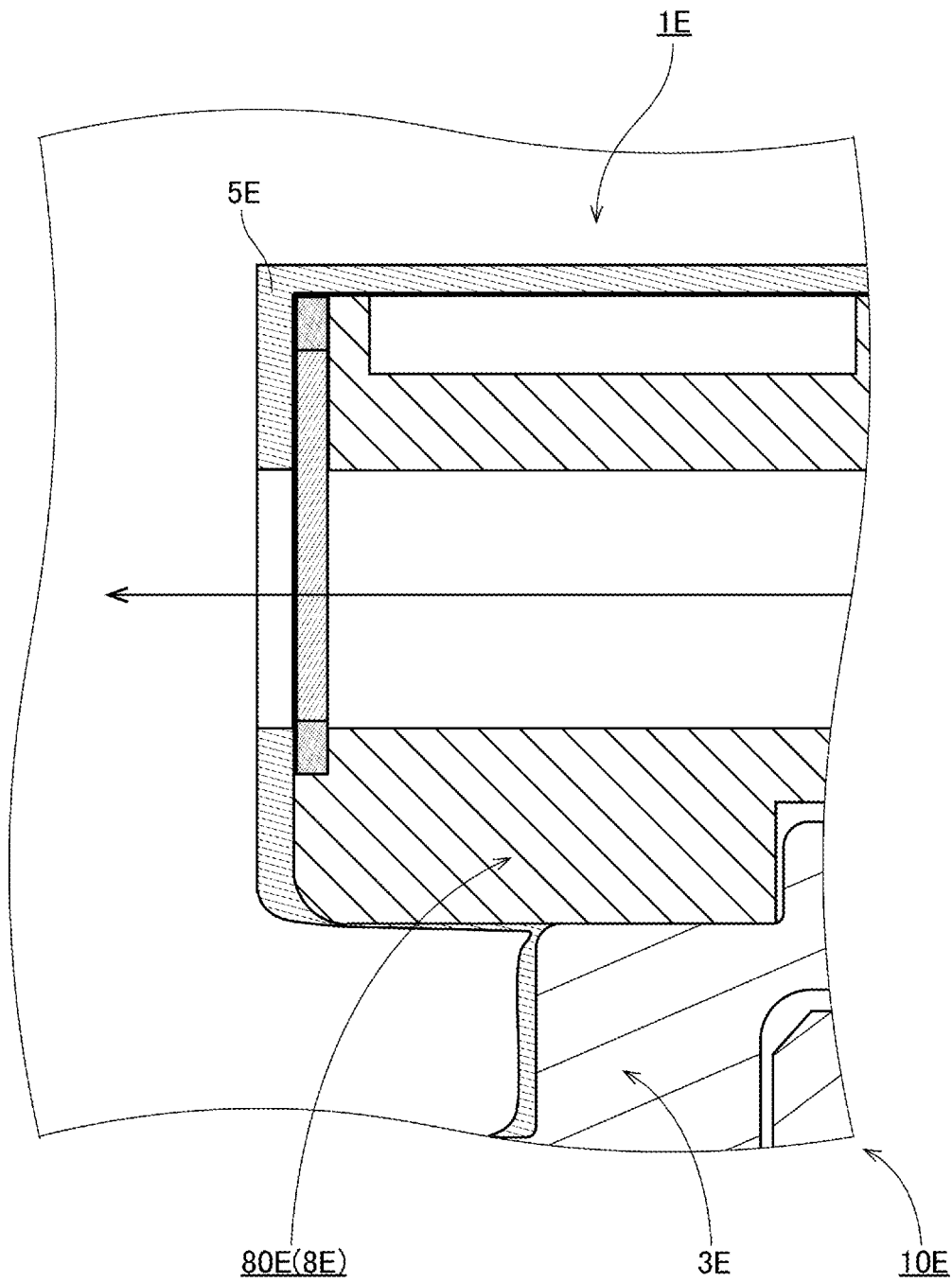
FIG. 8 is a partial vertical sectional view of a rotary drive apparatus according to a modification of the first preferred embodiment.

FIG. 8 is a partial vertical sectional view of a rotary drive apparatus 1E according to yet another modification of the first preferred embodiment. As in the modification illustrated in FIG. 8, a rotating portion 3E of a motor 10E may not include an inertia portion. In addition, a cover 5E may be arranged to cover a portion of a lower surface of a main body 80E of a flywheel 8E.

Figure 9:
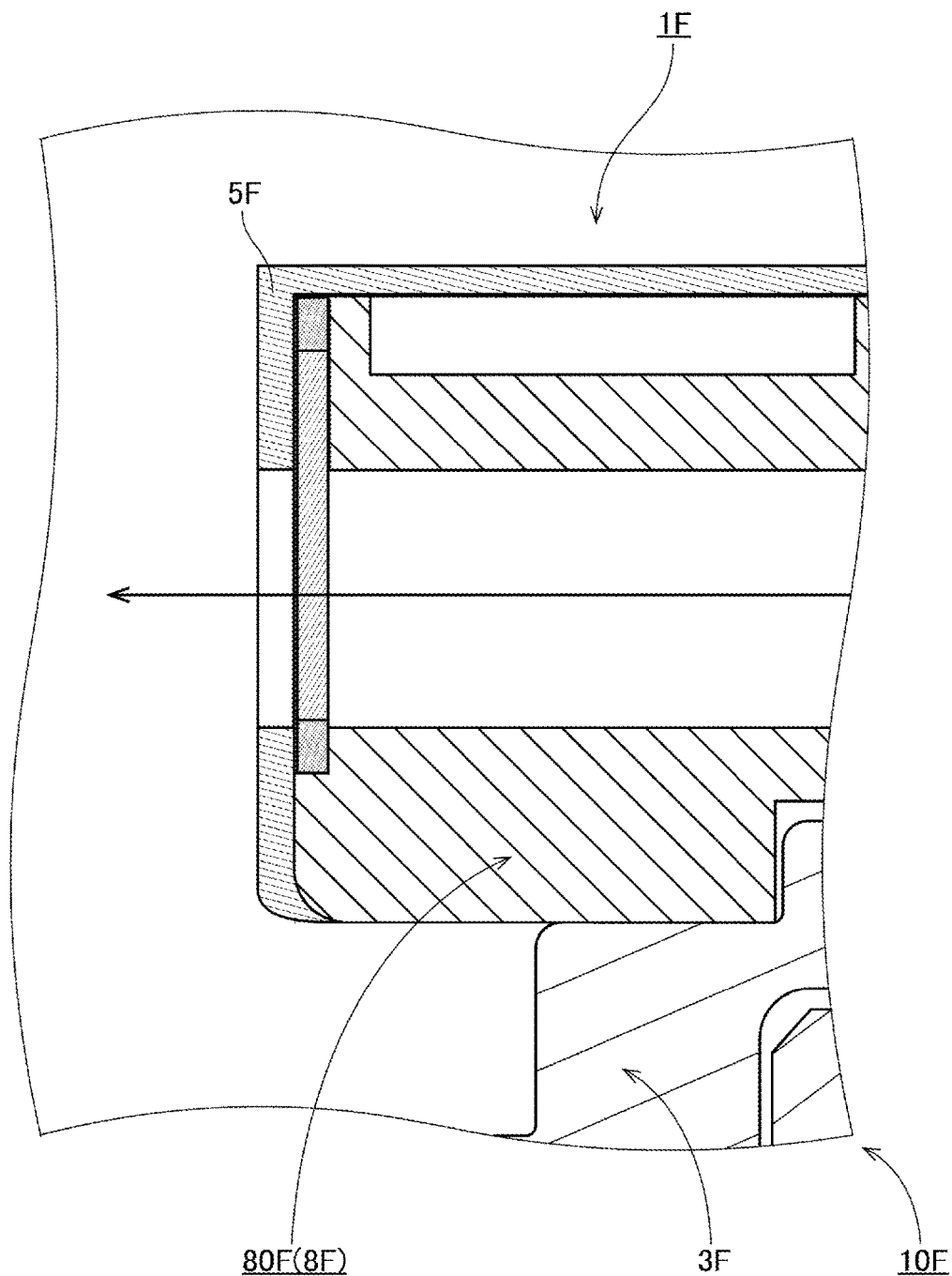
FIG. 9 is a partial vertical sectional view of a rotary drive apparatus according to a modification of the first preferred embodiment.

FIG. 9 is a partial vertical sectional view of a rotary drive apparatus 1F according to yet another modification of the first preferred embodiment. As in the modification illustrated in FIG. 9, a lower end portion of a cover 5F may be arranged on a portion of a lower surface of a main body 80F of a flywheel 8F, without an outer circumferential surface of a rotating portion 3F of a motor 10F being covered with the cover 5F. Note that the lower end portion of the cover 5F may alternatively be arranged to cover up to at least a portion of the outer circumferential surface of the rotating portion 3F of the motor 10F.

Figure 10:
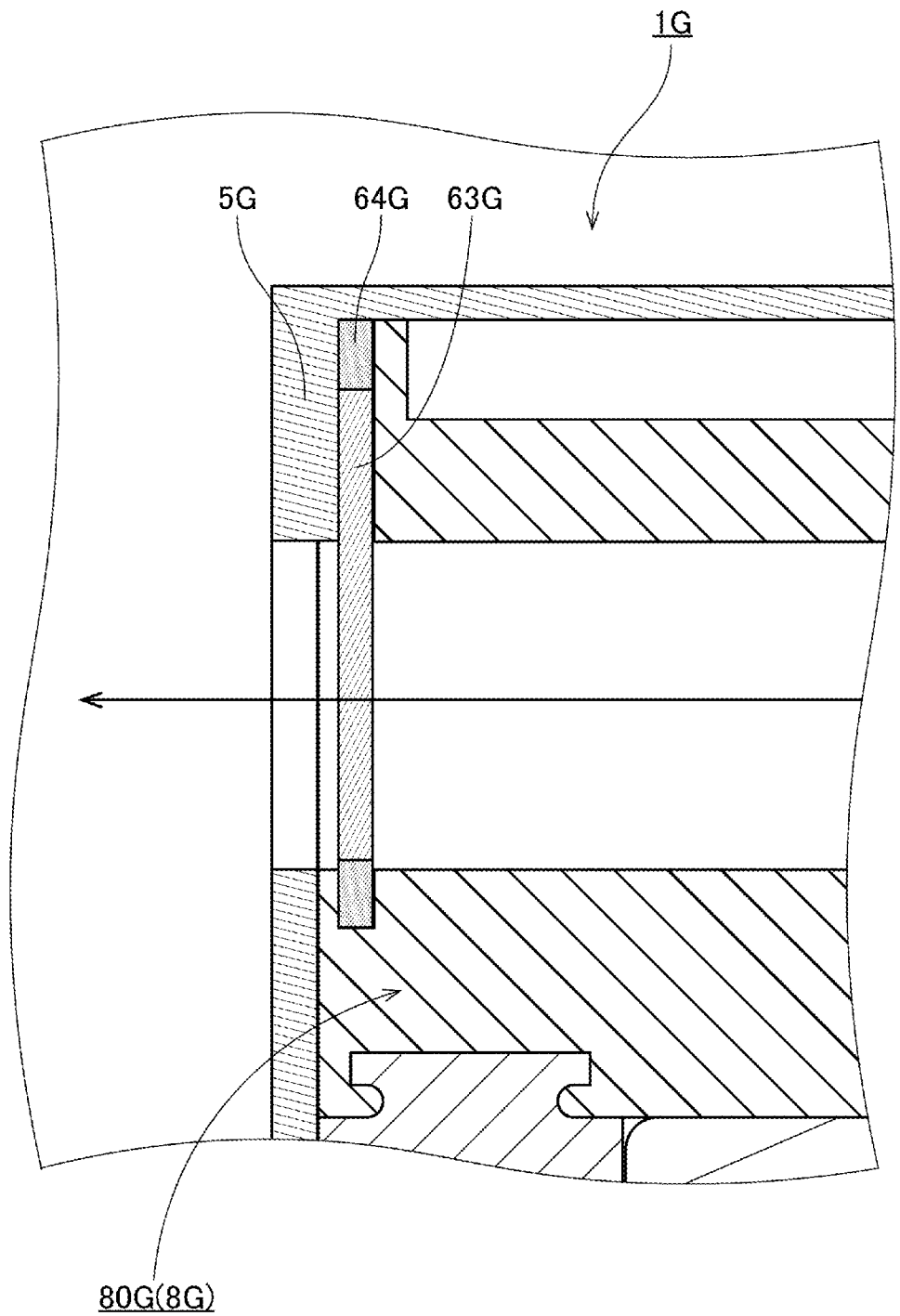
FIG. 10 is a partial vertical sectional view of a rotary drive apparatus according to a modification of the first preferred embodiment.

FIG. 10 is a partial vertical sectional view of a rotary drive apparatus 1G according to yet another modification of the first preferred embodiment. As in the modification illustrated in FIG. 10, an outer circumferential surface of a main body 80G of a flywheel 8G may be arranged at a radial position different from that of outer circumferential surfaces of a lens 63G and a lens frame 64G. A cover 5G can be fitted even to the outer circumferential surface of the main body 80G and the outer circumferential surfaces of the lens 63G and the lens frame 64G, which are arranged at different radial positions, by covering the flywheel 8G with the cover 5G, which is a heat-shrinkable tube as mentioned above, and causing the cover 5G to shrink. Thus, the lens 63G and the lens frame 64G can be securely fixed to the main body 80G of the flywheel 8G.

Figure 11:
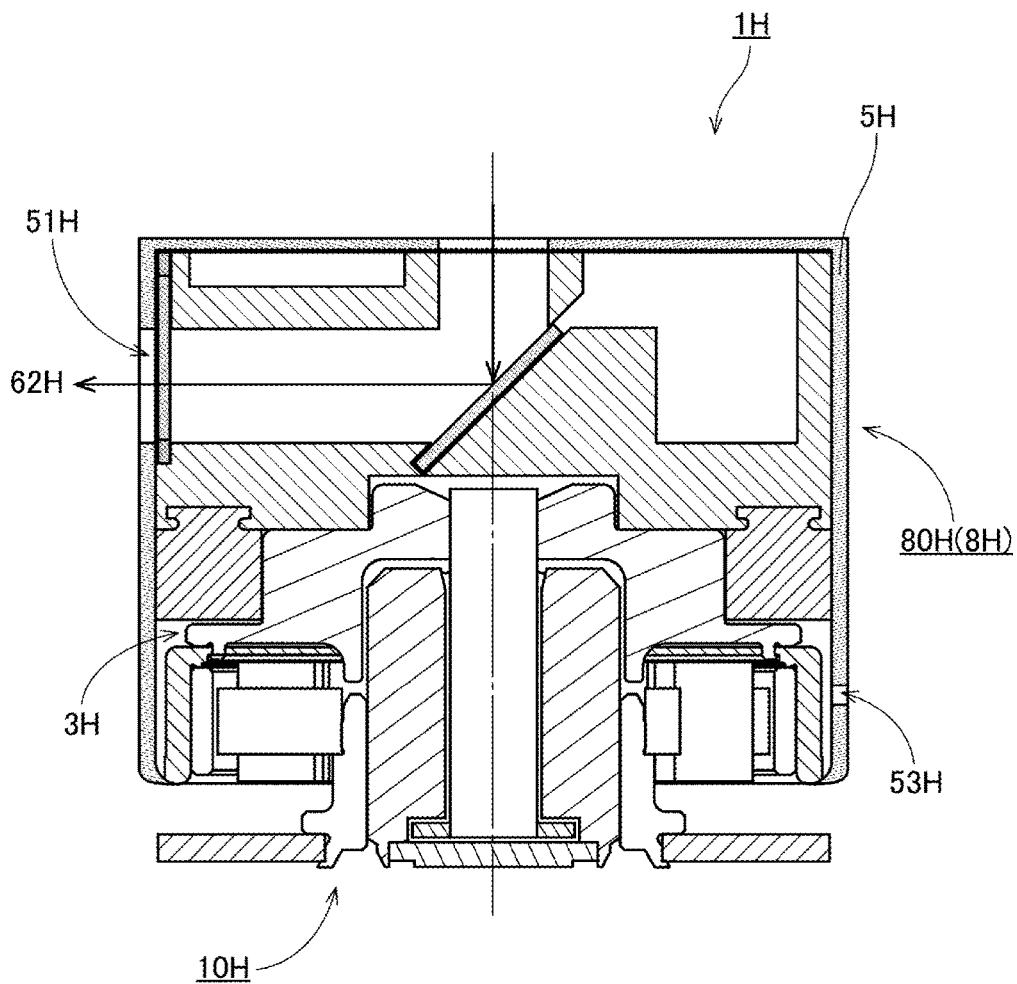
FIG. 11 is a vertical sectional view of a rotary drive apparatus according to a modification of the first preferred embodiment.

FIG. 11 is a vertical sectional view of a rotary drive apparatus 1H according to yet another modification of the first preferred embodiment. In the modification illustrated in FIG. 11, a cover 5H includes a through hole 53H arranged to pass through a portion of the cover 5H in a radial direction at a position different from that of a first opening 51H. At least a portion of a rotating portion 3H of a motor 10H is exposed to an outside of the rotary drive apparatus 1H through the through hole 53H. If infrared rays are emitted toward the through hole 53H from the outside of the rotary drive apparatus 1H, for example, when the rotating portion 3H is rotating while the rotary drive apparatus 1H is running, the infrared rays are reflected by an exposed portion of the rotating portion 3H. Then, the rotation speed of the rotary drive apparatus 1H can be recognized by sensing the reflected infrared rays with an infrared sensor provided separately. Note that the through hole 53H is preferably defined in a middle portion, i.e., not a peripheral portion, of the cover 5H, instead of being defined in the shape of a cut in the peripheral portion of the cover 5H. This contributes to preventing the cover 5H from being turned up or detached from the rotary drive apparatus 1H. Note that the through hole 53H can be used for positioning when the rotary drive apparatus 1H is covered with the cover 5H during manufacture of the rotary drive apparatus 1H.

Note that the detailed shape of any member may be different from the shape thereof as illustrated in the accompanying drawings of the present application. Also note that features of the above-described preferred embodiments and the modifications thereof may be combined appropriately as long as no conflict arises.

Preferred embodiments of the present invention are applicable to, for example, rotary drive apparatuses.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A rotary drive apparatus arranged to cause incoming light coming from a light source to be reflected, and rotate resulting reflected light, the rotary drive apparatus comprising:

a motor including a rotating portion arranged to rotate about a central axis extending in a vertical direction;

a flywheel arranged below the light source, supported by the rotating portion, and caused by the rotating portion to rotate about the central axis; and a cover arranged to cover at least a portion of the flywheel; wherein the flywheel includes:

a lens arranged to allow the reflected light to pass therethrough; and a main body arranged to directly support the lens, or indirectly support the lens through a lens frame arranged to accommodate the lens therein;

at least one of the lens and the lens frame is arranged radially outside of the main body;

an upper surface of the main body extends in a direction that radially crosses a first light path along which the incoming light travels, the first light path axially overlapping with at least a portion of the light source;

at least a portion of the lens is arranged to cross a second light path along which the reflected light travels;

at least a portion of the cover is arranged to extend all a way around the flywheel radially outside of the flywheel; and at least one of at least a portion of the lens and at least a portion of the lens frame is arranged radially inside of the cover.

2. The rotary drive apparatus according to claim 1, wherein the cover includes a first opening arranged to pass through a portion of the cover in a radial direction at a position radially overlapping with at least a portion of the lens.

3. The rotary drive apparatus according to claim 1, wherein the cover is arranged to cover at least a portion of the upper surface of the main body, and includes a second opening arranged to pass through a portion of the cover in an axial direction at a position axially overlapping with at least a portion of the light source.

4. The rotary drive apparatus according to claim 1, wherein the cover includes a cover tubular portion being tubular and arranged to extend in an axial direction radially outside of the flywheel, and a second opening arranged to pass through a portion of the cover in the axial direction at a position axially overlapping with at least a portion of the light source; and an outer circumferential edge of the second opening is arranged at an upper end portion of the cover tubular portion.

5. The rotary drive apparatus according to claim 1, wherein the cover is arranged to further cover at least a portion of an outer circumferential surface of the rotating portion.

6. The rotary drive apparatus according to claim 5, wherein the cover is arranged to cover the outer circumferential surface of the rotating portion over an entire circumferential extent thereof.

7. The rotary drive apparatus according to claim 1, wherein an outer circumferential surface of the cover is arranged to have a reflectivity lower than a reflectivity of an outer circumferential surface of the flywheel.

8. The rotary drive apparatus according to claim 1, wherein the cover is arranged to have a black outer circumferential surface.

9. The rotary drive apparatus according to claim 2, wherein the cover includes a through hole arranged to pass through a portion of the cover in a radial direction at a position different from that of the first opening.

10. The rotary drive apparatus according to claim 1, wherein the cover is a heat-shrinkable tube.

11. The rotary drive apparatus according to claim 1, wherein the cover is arranged to have a light-transmitting property.

* * * * *